United States Patent
Casotto

(10) Patent No.: US 7,937,706 B2
(45) Date of Patent: May 3, 2011

(54) METHOD AND SYSTEM FOR PERFORMING FAIR-SHARE PREEMPTION

(75) Inventor: Andrea Casotto, Fremont, CA (US)

(73) Assignee: Runtime Design Automation, Inc., Santa Clara, CA (US)

(*) Notice: Subject to any disclaimer, the term of this patent is extended or adjusted under 35 U.S.C. 154(b) by 1323 days.

(21) Appl. No.: 11/428,241

(22) Filed: Jun. 30, 2006

(65) Prior Publication Data

US 2007/0044102 A1 Feb. 22, 2007

Related U.S. Application Data

(60) Provisional application No. 60/709,810, filed on Aug. 22, 2005.

(51) Int. Cl.
*G06F 9/46* (2006.01)
(52) U.S. Cl. ....................................................... 718/103
(58) Field of Classification Search .................. 718/103
See application file for complete search history.

(56) References Cited

U.S. PATENT DOCUMENTS

| 4,084,224 | A | * | 4/1978 | Appell et al. ................. 718/100 |
| 5,987,601 | A | * | 11/1999 | Donovan ...................... 712/244 |
| 6,629,148 | B1 | | 9/2003 | Ahmed et al. |
| 7,657,893 | B2 | * | 2/2010 | Armstrong et al. ........... 718/104 |
| 2003/0120701 | A1 | | 6/2003 | Pulsipher et al. |
| 2003/0120708 | A1 | | 6/2003 | Pulsipher et al. |
| 2004/0128384 | A1 | | 7/2004 | Rolia et al. |
| 2004/0139302 | A1 | * | 7/2004 | Flautner et al. .............. 712/220 |
| 2004/0253940 | A1 | * | 12/2004 | Andrews et al. .............. 455/405 |

* cited by examiner

*Primary Examiner* — Meng-Ai An
*Assistant Examiner* — Blake Kumabe
(74) *Attorney, Agent, or Firm* — Michael A. Glenn; Glenn Patent Group

(57) ABSTRACT

A method and apparatus for performing fair-share preemption in a distributed computing environment is disclosed. The invention allows the suspension of jobs in a preempt-able set and the transfer of their respective resources, e.g. either hardware or software resources, to jobs in a preempting set. These activities are performed, all while assuring fairness among jobs scheduled to be executed and optimizing the use of available resources. In a preferred embodiment, the preempt-able and the preempting sets may include jobs characterized by, for example, job priorities, job ownership, or combinations thereof.

31 Claims, 5 Drawing Sheets

METHOD AND SYSTEM FOR PERFORMING FAIR-SHARE PREEMPTION

CROSS-REFERENCE TO RELATED APPLICATIONS

This application claims priority from U.S. provisional patent application Ser. No. 60/709,810, filed Aug. 22, 2005, the contents of which are incorporated herein in their entirety by this reference thereto.

BACKGROUND OF THE INVENTION

1. Technical Field

The invention relates to a distributed computing environment. More particularly, the invention relates to a method and apparatus for fair-share preemption of processes executed in a distributed computing environment.

2. Discussion of the Prior Art

Companies are increasingly using compute farms to efficiently perform the vast amount of computing tasks and services that are necessary to deliver increased computing capacity to their users. For purposes of the discussion herein, a compute farm is defined as a group of networked servers or, alternatively, as a networked multi-processor computing environment, in which work is distributed between multiple processors. The major components of the compute farm architecture include applications, central processors (CPUs) and memory resources, operating systems, a network infrastructure, a data storage infrastructure, load-sharing and scheduling mechanisms, in addition to means for monitoring and tuning the compute farm. A compute farm provides for more efficient processing by distributing the workload between individual components or processors of the farm and, thereby, execution of computing processes is expedited by using the available power of multiple processors.

Compute farms are usually coupled with a layer of a distributed resource management (DRM) system that is used for load-sharing between resources of the farm. The DRM performs numerous tasks, such as tracking processes' demand, selecting machines on which to run a given task or process, and prioritizing, as well as scheduling tasks for execution. Examples of DRM systems are the load-sharing facility (LSF) provided by Platform Computing™, OpenPBS, FT/NC® provided by Runtime Design Automation, and the like.

Resources are managed according to predefined policies to share the workload in a compute farm. These policies can be determined based on the number of CPUs, licenses, memory constraints, job priorities, duration of jobs, and so on. A set of queues is provided to fulfill the policies and efficiently manage the resources thus allowing the submission of jobs. A queue may be parameterized, for example, according to a scheduling priority, a number of jobs per user, a maximum run time of a job from that queue, an amount of memory that a job from that queue is expected to use, or any combination thereof. For example, the higher the scheduling priority of the queue, the stricter the resource limit on that queue. In contrast, a low priority queue might allow hundreds of concurrent jobs. However, these jobs can be preempted by jobs arriving from a higher priority queue. Regardless to the select policy, resources should be managed on a fair-share basis. Such fairness prevents starvation for computing resources of other users when one user has submitted a set of jobs that would consume all available job slots.

Many compute farm environments are capable of preempting computing resources, as required by applications executed on the farm. However, the shortcoming of prior art DRM solutions is the inability of such systems to preempt jobs while assuring fairness. As one example, a LSF system supports the preemption of low-priority jobs by high-priority jobs. That is, the LSF system preempts, i.e. suspends or terminates, lower-priority jobs if there is a scarcity of available recourses, and activates high-priority jobs. As a result, over time, a preempted low-priority job may always belong to the same user, instead of being a fair choice among all users who have low-priority jobs. Other preemption approaches, e.g. ownership based preemption, may be found in the related art and they similarly ignore the issue of fairness.

In view of the above, it would be, advantageous to provide a solution for preempting jobs while assuring fairness.

SUMMARY OF THE INVENTION

A method and apparatus for performing fair-share preemption in a distributed computing environment is disclosed. The invention allows the suspension of jobs in a preempt-able set and the transfer of their respective resources, e.g. either hardware or software resources, to jobs in a preempting set. These activities are performed, all while assuring fairness among jobs scheduled to be executed and optimizing the use of available resources. In a preferred embodiment, the preempt-able and the preempting sets may include jobs characterized by, for example, job priorities, job ownership, or combinations thereof.

DETAILED DESCRIPTION OF THE INVENTION

A method and apparatus for performing fair-share preemption in a distributed computing environment are disclosed. The invention allows the suspending of jobs in a preempt-able set and transferring their resources, either hardware or software resources, to jobs in a preempting set. These activities are performed while assuring fairness between jobs scheduled to be executed, and while optimizing the use of resources available in the distributed computing environment.

Figure 1:
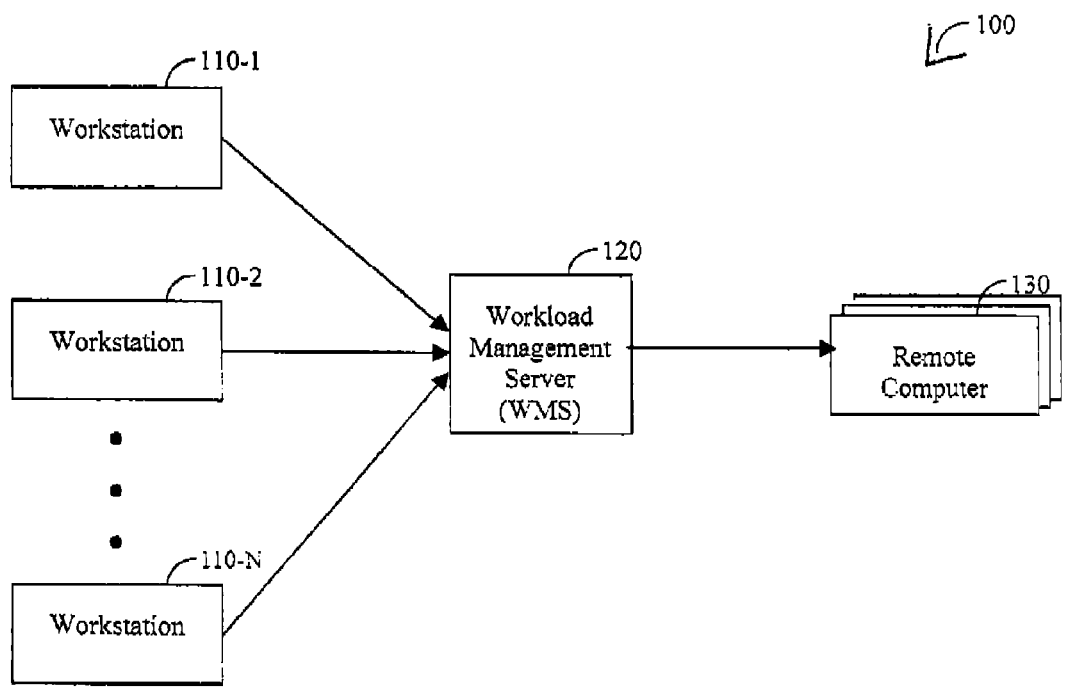
FIG. 1 is a block diagram of system architecture according to an embodiment of the invention.

FIG. 1 shows a typical system architecture 100 for the invention. The system 100 includes a plurality of workstations 110, a workload management server (WMS) 120, and a plurality of remote computers 130. Users create and submit job requests from workstations 110. Remote computers 130 provide computing means for executing jobs submitted by users of system 100.

The WMS 120 performs fair-share preemption, in addition to executing services typically provided by DRM systems. Specifically, the WMS 120 provides network computing services, such as load balancing, load sharing, job queuing, and resource management. The WMS 120 implements a fair preemption mechanism in accordance with the invention. The WMS 120 may comprise a single job queue (not shown) that contains all jobs to be executed on remote computers 130. The jobs are classified into buckets, each of which includes jobs that share the same attributes. The job attributes may be, but are not limited to, groups, users, resources, priorities, expected execution duration, or any combination thereof. In one embodiment of the invention the WMS 120 operates in conjunction with a batch scheduler (not shown) that distributes jobs to be executed on available resources of one or more of remote computers 130. This implementation of the invention is described in greater detail in connection with FIG. 5.

Figure 2:
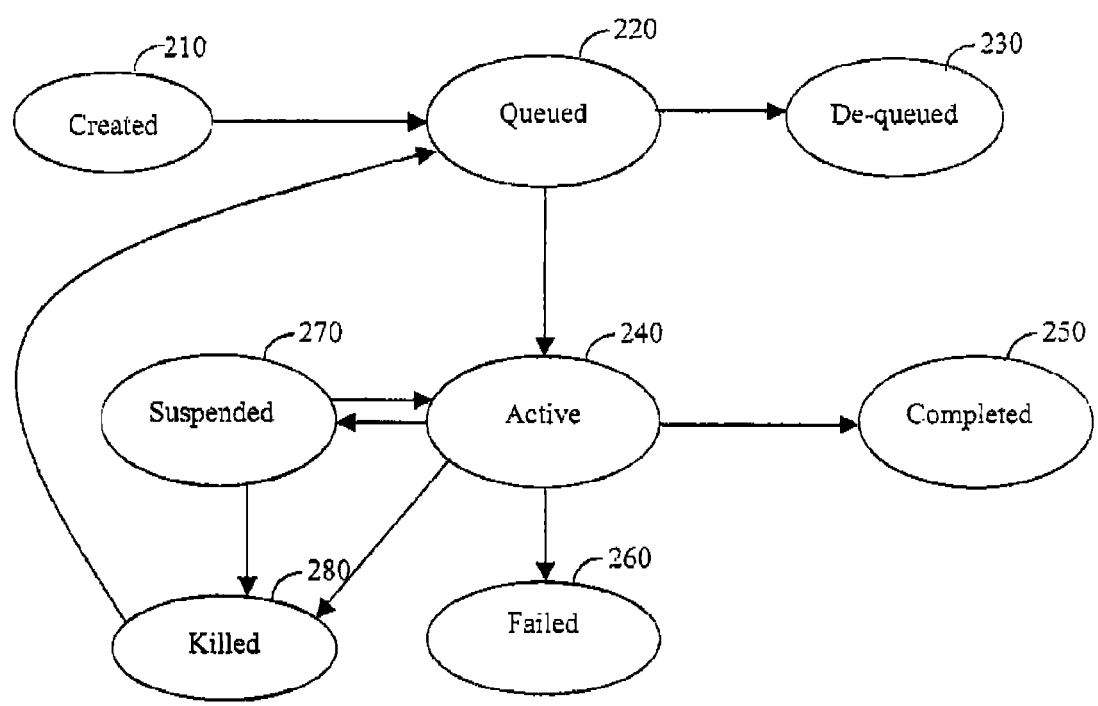
FIG. 2 is a schematic diagram illustrating the various states in which a job can exist.

Each job submitted to the WMS 120 has its own state, which determines the behavior of the job and limits the subsequent states to which the job can transition. The states in which a job can exist are shown in FIG. 2. When a job is first created, it is in the created state 210 that is the starting state for all jobs. A job moves from the created state 210 to the queued state 220 when it is waiting to be scheduled for execution. The queued state 220 denotes that the job has been scheduled, but it has not yet been sent to the compute farm for execution. The de-queued state 230 denotes that a job is removed from the queue, most likely because of a user request. When the job meets the criteria for execution, its state is changed from the queued state 220 to the active state 240. The criteria that allow a job to move from the queued state 220 to the active state 240 may such factors as the availability of the resources requested by the job resulting from the completion of a previous job that was holding some of such resources, the completion of an interdependent job or task, preemption of an interdependent job or task, and so on.

A job that completes its execution without error passes from the active state 240 to the completed state 250, which denotes that the job has been successfully completed. A job that fails to complete its execution changes from the active state 240 to the failed state 260. A job can also be set to the suspended state 270 when it is in the active state 240. A job may be suspended as a result of preemption, i.e. revoking resources from a running job and starting another job which needs those resources. On the other hand, a job can transit from the suspended state 270 to the active state 240, e.g. when the job is no longer suspended. In some implementations, instead of suspending a job the job is killed and then reactivated, i.e. the job transits from a killed state 280 to a queued state 220 and then to an active state 240.

In accordance with the invention, a job from which a resource can be revoked is referred to as the preempt-able job; and a job that can be started using a resource currently being used by another job is referred to as a preempting job. Preemption is managed by the WMS 120, which allows for different types of preemption including, but not limited to, a priority-based preemption, an ownership-based preemption, or a combination thereof. In the priority-based preemption, a job that is queued with higher priority may preempt a running job having a lower priority if the two jobs compete for the same depleted resources. In such case, the running job is stopped or suspended and then rescheduled to restart or resume after the high priority job completes. In ownership-based preemption, ownership is given to a group to share a pool of resources. During times of no contention for a resource, a member of any group can use up to the maximum available resources. When there is contention among groups for the resource, the WMS 120 tries to allocate the resource to each group according to its share. Running jobs of a group that holds more than the group's share of the resources are preempted, and jobs of groups holding less than their share of the resources are started. In addition, jobs within a group can be preempted according to their priorities.

The preempt-able and preempting jobs are respectively stored in two sets: a preempt-able set of jobs, and a preempting set of jobs. For example, the preempt-able set of jobs may include low priority jobs that use highly demanded resources, while the preempting set of jobs may include high priority jobs waiting to use the same highly demanded resources. To preempt jobs fairly in the preempt-able set, and to prevent starvation of these jobs the preempt-able jobs are ranked using an algorithm, described in greater detail below.

Figure 3:
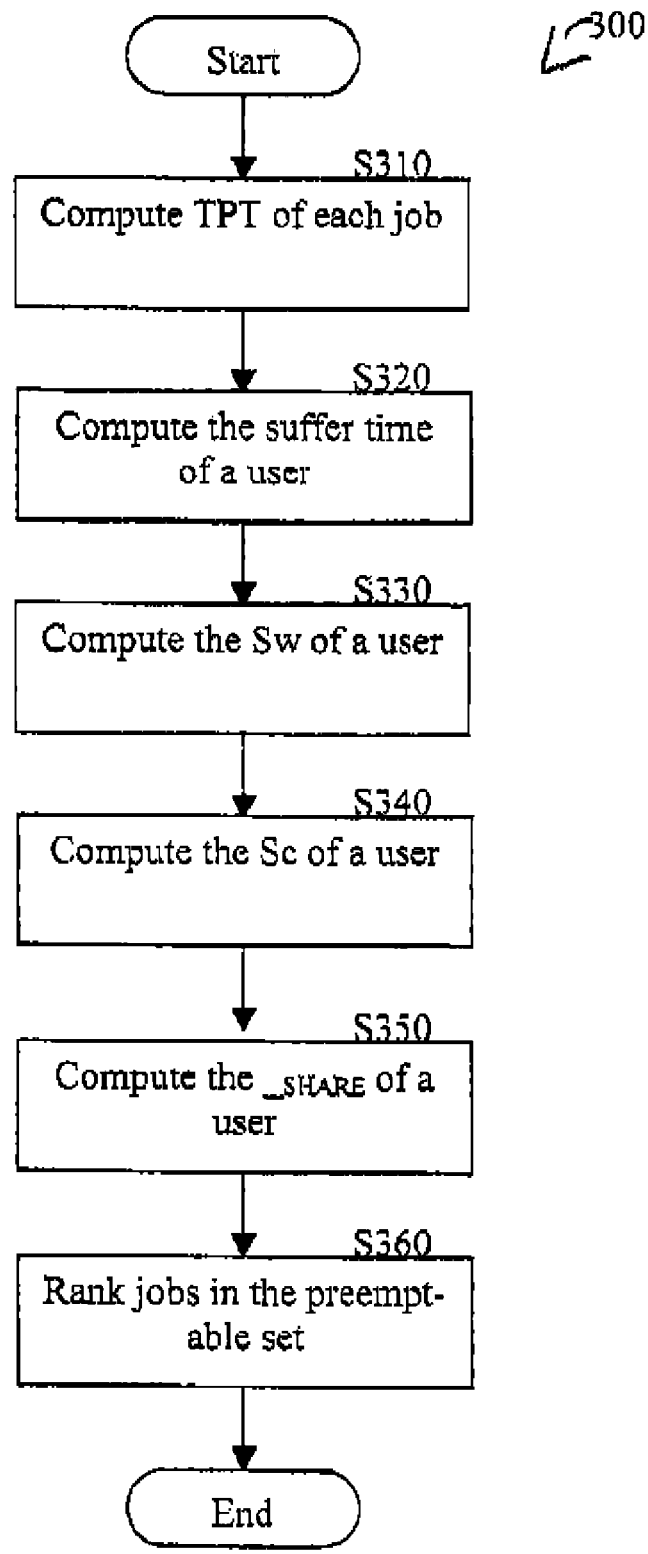
FIG. 3 is a flowchart showing an algorithm for performing fair-share preemption according to the invention.

FIG. 3 is a flowchart 300 that describes an algorithm for performing fair-share preemption in accordance with the invention. Fair-share preemption essentially ranks the jobs in the preempt-able set based on their actual and historical share (or usage). The share of a group of jobs owned by a specific user is determined by analysis of fair-share windows. For purposes of the discussion herein, a fair-share window is defined as a time period in the past in which a job or jobs where preempted. The size of a fair-share window is configurable.

Figure 4A:
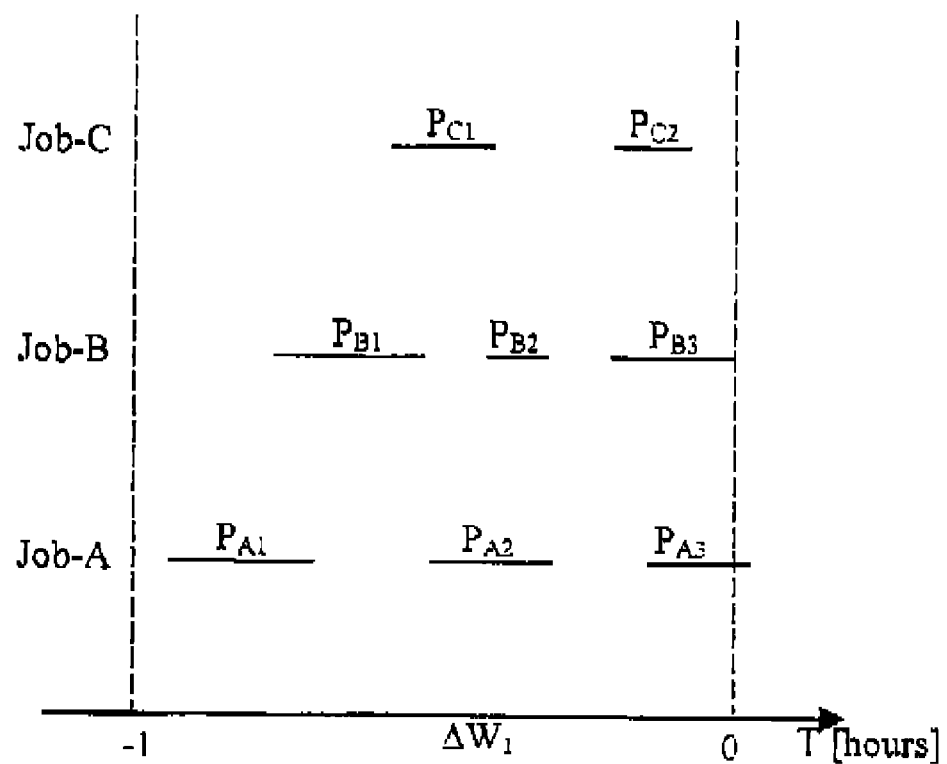
FIGS. 4a and 4b show exemplary suspension graphs according to the invention.

At step S310, for a given fair-share window $\Delta W$, the total preemption time (TPT) of each job is computed. That is, the TPT equals to the amount of time that a job was suspended. The preemption time can be derived from a suspension graph related to jobs in the queue. For example, FIG. 4A provides a suspension graph that shows a fair-share window $\Delta W_1$ in which jobs A, B, and C were preempted. In the fair-share window $\Delta W_1$, a job-A has been preempted at times $P_{A1}$, $P_{A2}$, and a portion of $P_{A3}$, a job-B has been preempted at times $P_{B1}$, $P_{B2}$, and $P_{B3}$, while a job-C has been preempted at times $P_{C1}$ and $P_{C2}$. The total preemption time of a job is computed as follows:

$$TPT_{job-\beta} = \Sigma_i P_\beta i; \quad (1)$$

where i is an index that runs on the number of preemption times in a fair-share window $\Delta W$. For example, the TPT of job-C is $P_{C1} + P_{C2}$.

At step S320, the total preemption time, in a fair-share window, of a group of jobs owned by a specific user, hereinafter the suffer time, is calculated. The suffer time is computed by summing the total preemption times (TPTs) of all jobs submitted by a specified user. For example, if jobs A and C are owned by a user X, then the suffer time of user-X in the fair-share window $\Delta W_1$ equals:

$$SufferTime_{user-X} = TPT_{job-A} + TPT_{job-C}. \quad (2)$$

The TPT of job is computed as described at step S310. If a job is suspended by killing and then reactivating, the suffer time equals to the total time that the job was active before killing it, plus the time that the job was queued before reactivating.

At step S330, the actual share (Sw) of each user in a fair-share window is computed. This is performed by dividing the suffer time of a user by the suffer times of all users in a given fair-share window. For example, if a user-Y submits the job-B, then the Sw of the user-X in a fair-share $\Delta W_1$ equals:

$$Sw_{user-X} = \frac{SufferTime_{user-X}}{SufferTime_{user-X} + SufferTime_{user-Y}}. \quad (3)$$

Note that the divisor may be equal to zero only if none of the jobs in the fair-share window are preempted.

At step S340, the current actual share (Sc) of a user is determined by examining the jobs that are being preempted now, namely at the end of the fair-share window. Specifically, the Sc is computed by dividing the number of jobs of a user that are now being preempted by the total number of jobs, regardless to their owner, that are currently being preempted. For example, the preempted jobs at time zero of the fair-share window $\Delta W_1$ are job-B and job-A, and thus the Sc of user-X, i.e. the owner of job-A, is: ½.

At step S350, the delta share ($\Delta_{SHARE}$) of a user is computed. The $\Delta_{SHARE}$ determines the distance of a target share parameter from the computed values of the Sc and Sw. The target share is a pre-configurable parameter that defines the percentage of time slots to allocate for each user to achieve fairness among all users having jobs in the queue. In one embodiment of the invention, the $\Delta_{SHARE}$ is computed as follows:

$$\Delta_{SHARE\ user-\alpha} = (TS - Sw_{user-\alpha}) + (TS - Sc_{user-\alpha}); \quad (4)$$

where TS is the target share.

The key to the fair-share preemption algorithm is bringing both Sc and $S_W$ of a user as close as practically possible to its TS. This is achieved by grading, at step S360, the jobs of the user in the preempt-able set according to a rating function. The rating function ranks each job in the preempt-able set in accordance with the computed actual share. In one embodiment of the invention, the $\Delta_{SHARE}$ ranges from minus two (−2) to plus two (+2). A user having $\Delta_{SHARE}$ value around +2 indicates that the user has a high target share, that the user has never been preempted in the fair-share window, and that he currently has no preempted jobs. Thus, his jobs in the preempt-able set are set with a high rank. Resources used by jobs having a high rank in the preempt-able set are likely to be revoked. Similar, a user having $\Delta_{SHARE}$ value around −2 indicates that the user has been preempted in the fair-share window and currently has a large number of preempted jobs. Thus, his jobs in the preempt-able set are set with a low rank.

Figure 4B:
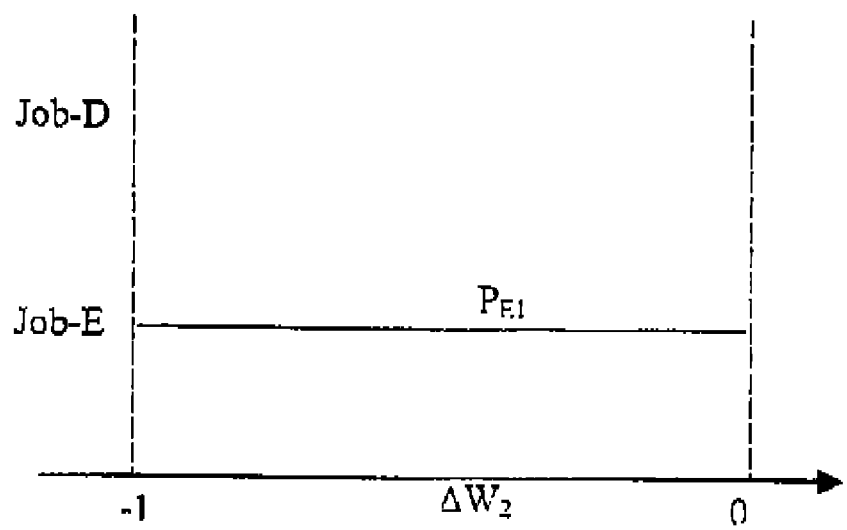

The following is a non-limiting example of grading jobs to achieve fair-share preemption between job D owned by a user Z and jobs F and E of user V. In the suspension graph shown in FIG. 4B, only job-E is preempted during the entire fair-share window $\Delta W_2$, namely job-D and job-F are executed during that time interval. Therefore, the TPT of job-E is one hour, as the size of $\Delta W_2$, and the TPT of job-D is zero. Accordingly, the suffer time of user-V is one hour and the suffer time of user-Z is zero. Consequently, the computed Sw values of users V and Z are as follows:

$$Sw_{user-V} = 1; \text{ and} \quad (5)$$

$$Sw_{user-Z} = 0. \quad (6)$$

The computed Sc values of users V and Z are:

$$Sc_{user-V} = 1; \text{ and} \quad (7)$$

$$Sc_{user-Z} = 0. \quad (8)$$

Using the computed Sc and Sw values the $\Delta_{SHARE}$ of the user-V and user-Z are calculated. In this example, the target share that equals 50 percent. The resultant $\Delta_{SHARE}$ values are:

$$\Delta_{SHARE\ user-V} = (½ - 1) + (½ - 1) = -1; \text{ and} \quad (9)$$

$$\Delta_{SHARE\ user-Z} = (½ - 0) + (½ - 0) = +1. \quad (10)$$

For these $\Delta_{SHARE}$ values, the ranking function ranks job-E of user-V with a lower rank priority and job-D of user-Z of with a higher rank. A new high-priority job G from a user Y is submitted and, according to a predefined policy, another job should be preempted to run job-G. Currently, there are two candidate jobs to be preempted D and F. However, to achieve fairness, as determined by the $\Delta_{SHARE}$ values, the job-D of user Z is suspended.

Figure 5:
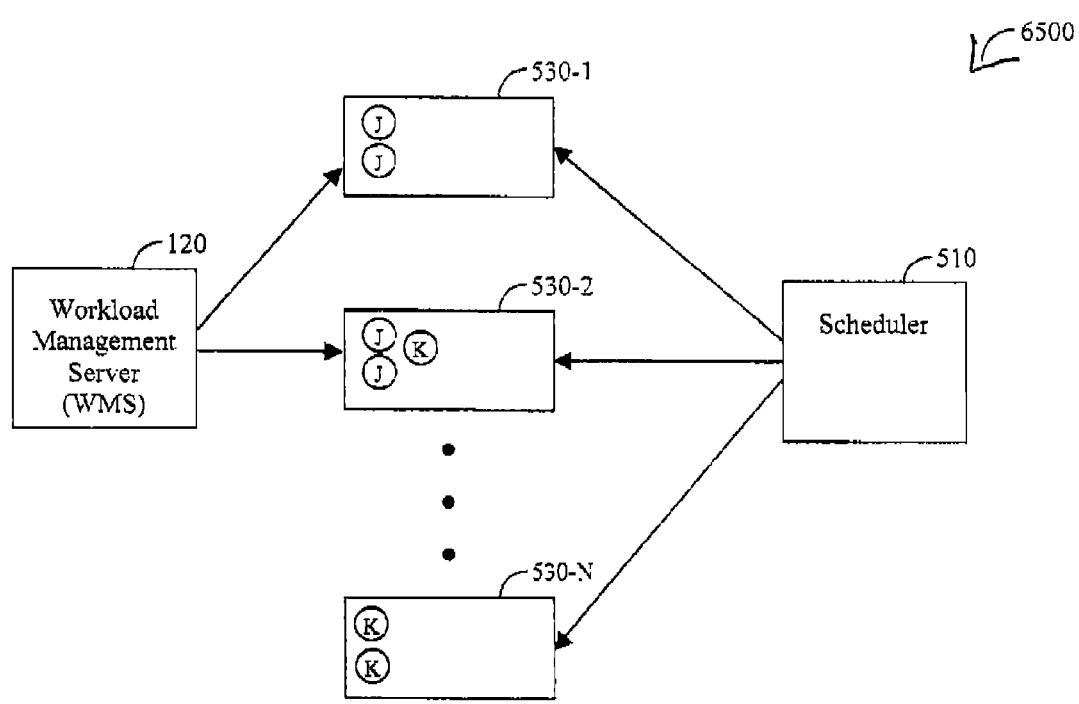
FIG. 5 is a block diagram of system architecture used for demonstrating the operation of the WMS in conjunction with a batch scheduler according to the invention.

FIG. 5 shows a system architecture 500 implementing the WMS 120 with a scheduler. The scheduler 510 of the system 500 distributes jobs to be executed on available resources of one or more remote computers 530. The scheduler 510 may be, but is not limited to, a batch scheduler within the LSF, an event driven scheduler provided by Runtime Design Automation, a batch scheduler provided by OpenPBS, and the like. According to this embodiment, jobs are submitted by users to the WMS 120, which sends information by means of an execution agent to scheduler 510 and sends commands to run jobs over remote computers 530. The scheduler 510, in turn, dispatches jobs to execution according to its pre-defined policy. Once jobs submitted to the WMS 120 are executed over the remote computers 130, the WMS 120 can preempt these jobs as described in greater detail above. Illustratively, the jobs labeled as 'J' are jobs that submitted to the WMS 120 and thus can be preempted by the WMS 120. Whereas, jobs labeled as 'K' are jobs that are not submitted to the WMS 120, and thus can be controlled only by the batch scheduler 510.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for performing fair-share job preemption for a plurality of jobs in a distributed computing environment, comprising the steps of:
   maintaining a set of preempt-able jobs and a set of preempting jobs, wherein use of at least a resource in the distributed computing environment by a preempt-able job is revokable, and wherein a preempting job is allowed to start using said at least a resource in the distributed computing environment if said resource is being currently used by at least one preempt-able job;
   determining for each preempt-able job of the plurality of jobs a historical share respective of total preemption time of said each job in a fair-share window, wherein a fair-share window is a configurable time period value in which said each job was preempted;
   determining for each user a current actual share respective of total preemption time of each user's jobs being preempted at the end of said fair-share window; and
   prioritizing preempt-able jobs based on said historical share of said each job and said current actual share of said each user.

2. The method of claim 1, wherein said at least a resource comprises any of: a central processing unit, a memory, and a software license.

3. The method of claim 1, said steps of determining said historical share further comprising the steps of:
   computing, for each job, a total preemption time (TPT) in said fair-share window, wherein said TPT corresponds to an accumulative time in which said each job was suspended due to preemption; and
   computing a suffer time for a user, wherein said suffer time is respective of a total preemption time for a group of jobs owned by a specific user.

4. The method of claim 3, said steps of computing said suffer time for a user further comprising the steps of:
   summing TPTs of jobs that belong to said user; and
   dividing said suffer time of said user by suffer times of all users.

5. The method of claim 1, wherein said fair-share window comprises a predetermined time-interval.

6. The method of claim 1, said steps of wherein computing said current share further comprising the steps of:
dividing a number of preempted jobs of a said user that are preempted by a total number of jobs that are preempted in the distributed computing environment.

7. The method of claim 1, wherein said prioritizing comprises computation of a $\Delta_{share}$ is computed using the following equation:

$$\Delta_{share\ user-\alpha} = (\text{target-share} - Sw_{user-\alpha}) + (\text{target-share} - Sc_{user-\alpha})$$

wherein said target-share comprises a pre-configurable parameter that defines a percentage of time slots to allocate for each user, said $Sw_{user-\alpha}$ is said historical share of a user, and said $Sc_{user-\alpha}$ is said current share of the user.

8. The method of claim 7, said step of prioritizing said preempt-able jobs further comprising the step of:
assigning a priority ranking to a preempt-able job according to the $\Delta_{share}$ computed for a user that owns said job.

9. The method of claim 1, wherein said fair-share preemption comprises any of: a priority-based preemption or an ownership-based preemption.

10. A computer program product for enabling operation of a method for performing fair-share job preemption for a plurality of jobs in a distributed computing environment, the computer program product having computer instructions on a memory, the instructions comprising the steps of:
maintaining a set of preempt-able jobs and a set of preempting jobs, wherein use of at least a resource in the distributed computing environment by a preempt-able job is revokable, and wherein a preempting job is allowed to start using said at least a resource in the distributed computing environment if said resource is being currently used by at least one preempt-able job;
determining for each preempt-able job of the plurality of jobs a historical share respective of total preemption time of said each job in a fair-share window, wherein a fair-share window is a configurable time period value in which said each job was preempted;
determining for each user a current actual share respective of total preemption time of each user's jobs being preempted at the end of said fair-share window; and
prioritizing preempt-able jobs based on said historical share of said each job and said current actual share of said each user.

11. The computer program product of claim 10, wherein said at least a resource comprises any of: a central processing unit (CPU), a memory, and a software license.

12. The computer program product of claim 10, said steps of determining said historical share further comprising the steps of:
computing, for each job, a total preemption time (TPT) in said fair-share window, wherein said TPT corresponds to an accumulative time in which said each job was suspended due to preemption; and
computing a suffer time for a user, wherein said suffer time is respective of a total preemption time for a group of jobs owned by a specific user.

13. The computer program product of claim 12, said steps of computing said suffer time for said user comprising the steps of:
summing TPTs of jobs that belong to said user; and
dividing said suffer time for said user by the suffer times of all users.

14. The computer program product of claim 10, wherein said fair-share window comprises a predetermined time-interval.

15. The computer program product of claim 10, said steps of wherein computing said current share further comprising the steps of:
dividing a number of preempted jobs of a said user that are preempted by a total number of jobs that are preempted in the distributed computing environment.

16. The computer program product of claim 10, wherein said prioritizing comprises computation of a $\Delta_{share}$ is computed using the following equation:

$$\Delta_{share\ user-\alpha} = (\text{target-share} - Sw_{user-\alpha}) + (\text{target-share} - Sc_{user-\alpha})$$

wherein said target-share comprises a pre-configurable parameter that defines a percentage of time slots to allocate for each user, said $Sw_{user-\alpha}$ is said historical share of a user, and said $Sc_{user-\alpha}$ is said current share of the user.

17. The computer program product of claim 16, said steps of prioritizing said preempt-able jobs further comprising the steps of:
assigning a priority ranking to a preempt-able job according to the $\Delta_{share}$ computed for a user that owns said job.

18. The computer program product of claim 16, wherein said fair-share preemption comprises any of: a priority-based preemption and an ownership-based preemption.

19. A computer system for performing job fair-share preemption for a plurality of jobs in a distributed computing environment, the computer system comprising a processor and a memory that is under control of said processor, said system comprising:
means for maintaining a set of preempt-able jobs and a set of preempting jobs, wherein use of at least a resource in the distributed computing environment by a preempt-able job is revokable, and wherein a preempting job is allowed to start using said at least a resource in the distributed computing environment if said resource is being currently used by at least one preempt-able job;
means for determining for each preempt-able job of the plurality of jobs a historical share respective of total preemption time of said each job in a fair-share window, wherein a fair-share window is a configurable time period value in which said each job was preempted;
means for determining for each user a current actual share respective of total preemption time of each user's jobs being preempted at the end of said fair-share window; and
means for prioritizing preempt-able jobs based on said historical share of said each job and said current actual share of said each user.

20. The system of claim 19, wherein said at least a resource comprises any of: a central processing unit (CPU), a memory, and a software license.

21. The system of claim 19, said means for determining said historical share further comprising:
means for computing, for each job, a total preemption time (TPT) in said fair-share window, wherein said TPT corresponds to an accumulative time in which said each job was suspended due to preemption; and
means for computing a suffer time for a user, wherein said suffer time is respective of a total preemption time for a group of jobs owned by a specific user.

22. The system of claim 21, said means for computing said suffer time for said user comprising:
means for summing TPTs of jobs belong to said user; and
means for dividing said suffer time for said user by the suffer times for all users.

23. The system of claim 19, said fair-share window comprising a predetermined time-interval.

24. The system of claim 19, said means for computing said current share further comprising:
means for dividing a number of preempted jobs of a said user that are preempted by a total number of jobs that are preempted in the distributed computing environment.

25. The system of claim 19, wherein said means for prioritizing comprises compute of a $\Delta_{share}$ is computed using the following equation:

$$\Delta_{share\ user-\alpha} = (\text{target-share} - Sw_{user-\alpha}) + (\text{target-share} - Sc_{user-\alpha})$$

wherein said target-share comprises a pre-configurable parameter that defines a percentage of time slots to allocate for each user, said $Sw_{user-\alpha}$ is said historical share of a user, and said $Sc_{user-\alpha}$ is said current share of the user.

26. The system of claim 25, said means for prioritizing said preempt-able jobs further comprising:
means for assigning a priority ranking to a preempt-able job according to a $\Delta_{share}$ computed for a user that owns said job.

27. The system of claim 19, said means for fair-share preemption comprises any of: a priority-based preemption and an ownership-based preemption.

28. The system of claim 19, wherein said system is coupled between a plurality of workstations and a plurality of remote computers.

29. The system of claim 28, wherein said remote computers are coupled to a scheduler.

30. The system of claim 29, wherein said scheduler comprises any of: a batch scheduler and an event driven scheduler.

31. The system of claim 19, further comprising:
a job queue for maintaining said set of preempt-able jobs and said set of preempting jobs.

* * * * *